W. G. SHELTON.
TRANSMISSION MECHANISM.
APPLICATION FILED OCT. 28, 1915.
1,201,367.
Patented Oct. 17, 1916.
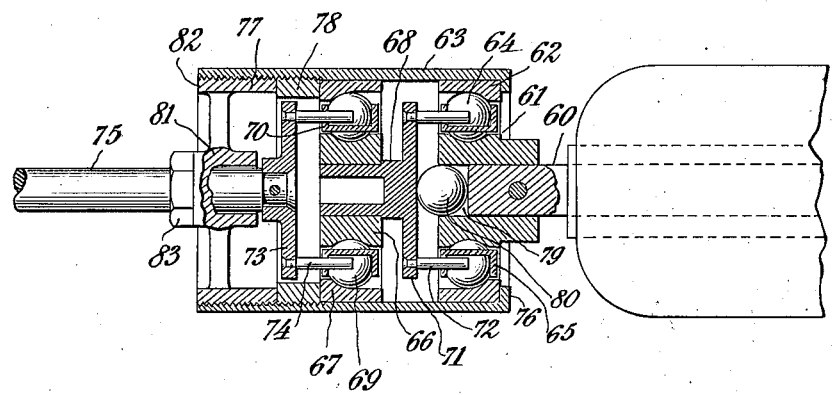
WITNESSES:
INVENTOR
William Gentry Shelton
By Attorneys,
Fraser, Tink & Myers

UNITED STATES PATENT OFFICE.

WILLIAM GENTRY SHELTON, OF NEW YORK, N. Y.

TRANSMISSION MECHANISM.

1,201,367.  Specification of Letters Patent.  Patented Oct. 17, 1916.

Application filed October 28, 1915. Serial No. 58,307.

*To all whom it may concern:*

Be it known that I, WILLIAM GENTRY SHELTON, a citizen of the United States of America, residing in the borough of Manhattan, city, county, and State of New York, have invented certain new and useful Improvements in Transmission Mechanism, of which the following is a specification.

This invention relates to transmission mechanism, and has for an object to provide an improved reduction transmission mechanism peculiarly adapted for use in connection with small mechanisms, such, for instance, as a self-contained dental engine and hand piece.

The improvement is based upon the principles of roller or ball bearing mechanism, wherein it has been demonstrated that if the inner ring of a ball bearing be connected to the driving element and the cage be connected to the driven element, and the outer ring be impeded in its rotation, the speed communicated from the driving to the driven element is greatly reduced. In certain classes of mechanism, as, for instance, the driving of a dental engine which is constructed as a self-contained hand tool, it is necessary that the rotary element of the electric motor be driven at a very high speed, much higher, in fact, than it is possible to rotate the drill or other instrument. Therefore, it becomes necessary to reduce the rotation. If but a single reduction element of the roller type is provided between the driving and the driven elements, the speeding up of the motor, when the instrument is not at work, is disadvantageous.

The object of the present improvement is largely to minimize this undesirable feature, and I therefore make use of a double reduction which not only serves to reduce the speed transmitted, but also to prevent the abnormal differences between the rate of rotation when the tool is at its work and when it is running idle.

A plurality of connecting units formed after the analogy of a ball bearing, are provided in my improved structure. In the illustrative example a pair of such units is shown. For convenience and brevity the language of this specification is expressed largely in terms of ball bearings. A certain amount of initial load upon the ball bearings is necessary to enable them to perform their tractive duty and this load must obviously be properly equalized. It is also desirable that the ball cages be shielded from thrusts and twisting tendencies.

In the drawings accompanying this application, a practicable embodiment of a form of my invention is shown in central longitudinal section.

In some instances it is desirable to place the transmission units in juxtaposition. An illustration of this is illustrated. The driven element is here represented as an armature shaft 60. This shaft is shown carrying the inner ring 61, the outer ring 62 being held and prevented from rotation by a framework, shown in the form of a casing 63. Suitable balls 64 are mounted between these rings, and a cage 65 is shown for the balls. The frame 63 carries the outer ring 66 of the second transmission unit or reduction unit, the inner ring 66 of which unit is shown fast upon a stub shaft 68. Balls 69 are shown located between and running upon the rings 66 and 67, a cage 70 being provided for the balls. The shaft 68 is provided with a flange 71. This flange carries pins 72 passing through the cage 65. A plate 73 is disposed outwardly of the rings 66, 67, and carries pins 74 passing through the cage 70. The spindle or driven element 75 is shown fast with the plate 73. By this reduction construction upon the rotation of the armature the inner ring 61 rotates and causes a slower rotation of the cage 65. This cage is connected to the shaft 68 which is connected to the inner ring 67, this ring is rotated at the same rate of speed as the cage 65, and through the balls, rotates the cage 70 and thereby transmits a still further reduced rotation to the spindle 75, the reduction being about one to ten.

Initial load is preferably applied to the ball bearings to enable them to properly perform their transmission functions. A single movable part for adjustably applying this load has its advantages especially when the mechanism is capable of equalizing the force applying such load. The casing 63 is shown provided at one end with an abutment in the form of a flange 76 for positioning the outer ring 62 of one unit, the other end of the casing is shown interiorly screw-threaded at 77 for receiving a ring 78 which constitutes an adjustable abutment for the outer ring 67 of the other unit. By this means the position of the rings 62 and 67 one relative to the other is effected. It is also desirable to provide for the inner rings a thrust bearing for maintaining them in proper relative positions and for sustaining the units against displacement by the load applying means. In the illustration a self alining thrust bearing is shown interposed between the inner rings. A socket 79 is formed in the side of the inner ring 61 which faces the other ball bearing or transmission unit. The end of the driving shaft 60 in the illustration forms the bottom of the socket. A ball 80 is shown seated in the socket 79 and engaging by a single point contact the plate 71. This plate is, as was before stated, fast with the inner ring 66. The thrust bearing serves to equalize the intial load applied by the adjustable ring 78.

The balls of a ball bearing while capable of carrying loads in the direction of their normal revolution and of resisting torque applied in the plane of their orbital path are nevertheless very sensitive to thrusts applied in other directions, particularly when communicated to them through their cage or retainer. In the illustration the ball cage 70 is protected from the thrusts and twistings which might be communicated to it from the spindle 75, by means of a bearing 81 carried by a screw ring 82 and an abutment in the form of a nut 83 mounted on the spindle. The self alining thrust bearing in the ball 80 serves like functions for the cage 65.

It will be apparent that the form of the invention shown in the drawings and described is an illustrative embodiment and that changes may be made within the scope of the claims without departing from the spirit of the invention. It is also obvious that bearings having balls have been shown as a convenient means for illustrating the use of a structure formed after the analogy of a ball or roller bearing and that rollers and balls are in the present construction substantially analogous or interchangeable.

What I claim is:—

1. A transmission mechanism comprising a pair of ball bearings, the cage of one of these being connected to the inner ring of the other, the other inner ring and cage being respectively provided with means for connection to rotary elements, and a thrust bearing between the said inner rings.

2. A transmission mechanism comprising a driving element and a driven element disposed in axial alinement, a pair of ball bearings, and means for connecting the driving and driven element through the cages of both ball bearings, the inner ring of one ball bearing being connected to the driving element, and the cage being connected to the inner ring of the other ball bearing, and the other cage being connected to the driven element, bearing means for maintaining the inner rings in predetermined relative positions, and adjusting means for the outer rings coöperative with the bearing means for applying initial load to and equalizing the same between the respective said ball bearings.

3. A transmission mechanism comprising a pair of ball bearings disposed in axial alinement, the cage of one of these being connected to the inner ring of the other, the other inner ring and cage being respectively provided with means for connection to rotary elements, bearing means for maintaining the inner rings in predetermined relative positions, and adjusting means for the outer rings coöperative with the bearing means for applying initial load to and equalizing the same between the respective said ball bearings.

4. A transmission mechanism comprising a pair of ball bearings, the cage of one of these being connected to the inner ring of the other, the other inner ring and cage being respectively provided with means for connection to rotary elements, one of said inner rings being provided on its side facing the other with an axially disposed socket and a ball mounted in such socket and affording a self alining thrust bearing between the said inner rings.

5. A transmission mechanism comprising a driving element and a driven element, a pair of ball bearings, and means for connecting the driving and driven element through the cages of both ball bearings, the inner ring of one ball bearing being connected to the driving element, and the cage being connected to the inner ring of the other ball bearing, a bearing for resisting the thrust of the said inner ring toward the said cage, and the other cage being connected to the driven element.

In witness whereof, I have hereunto signed my name in the presence of two subscribing witnesses.

WILLIAM GENTRY SHELTON.

Witnesses:
 CHAS. LYON RUSSELL,
 FRED WHITE.